Nov. 11, 1969　　J. D. SNODGRASS　　3,478,202
RECORDING SYSTEM
Original Filed Nov. 1, 1965　　　　　　　　3 Sheets-Sheet 1
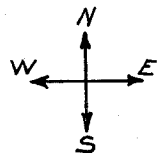
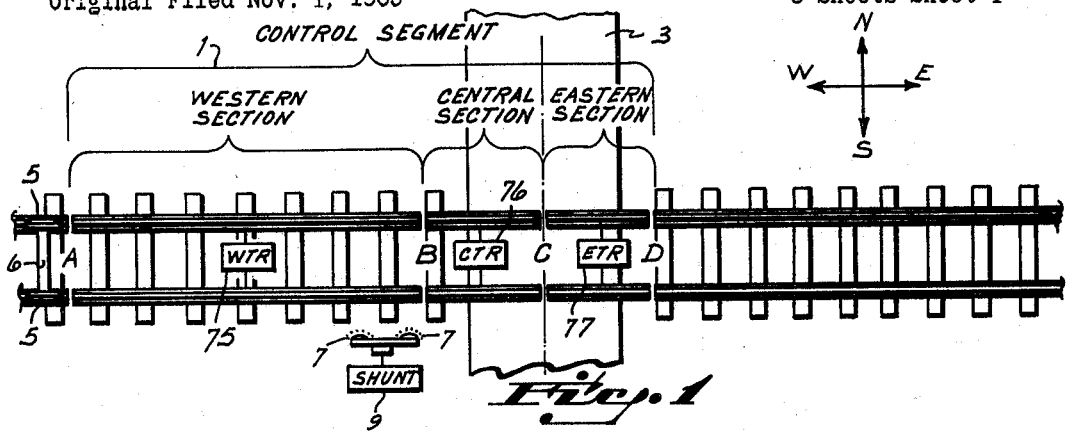
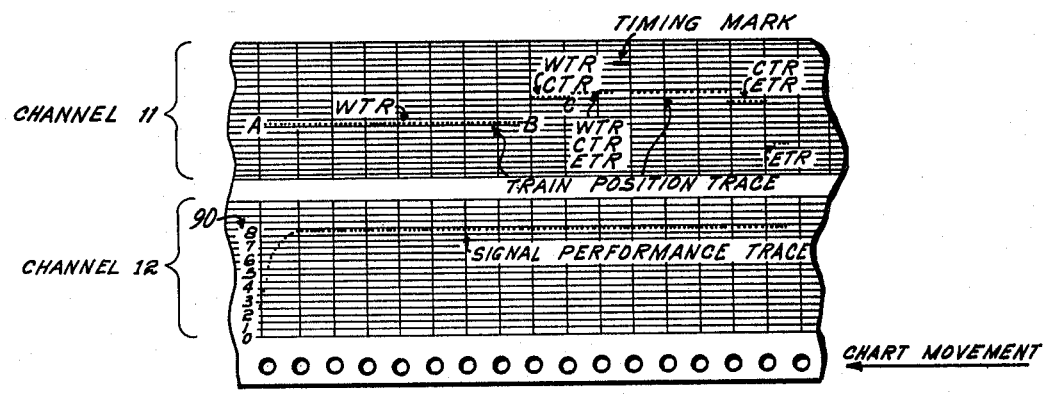
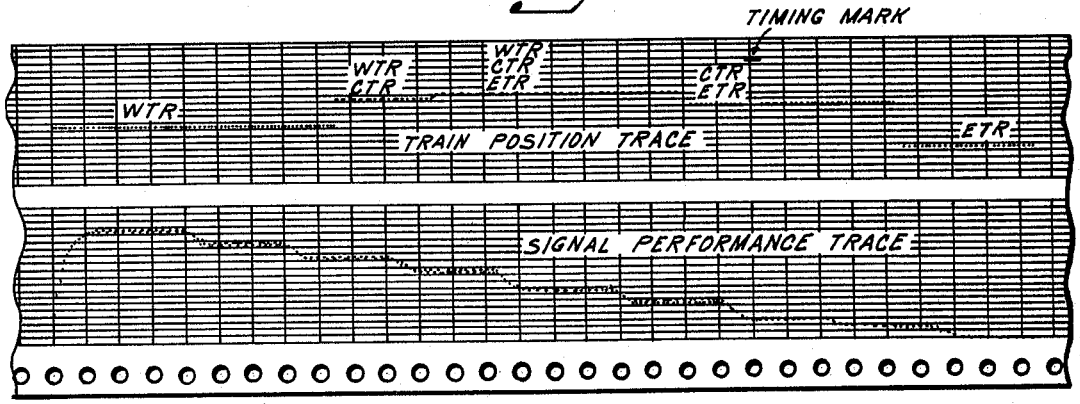
INVENTOR
James D. Snodgrass
BY
Wood, Herron and Evans
ATTORNEYS

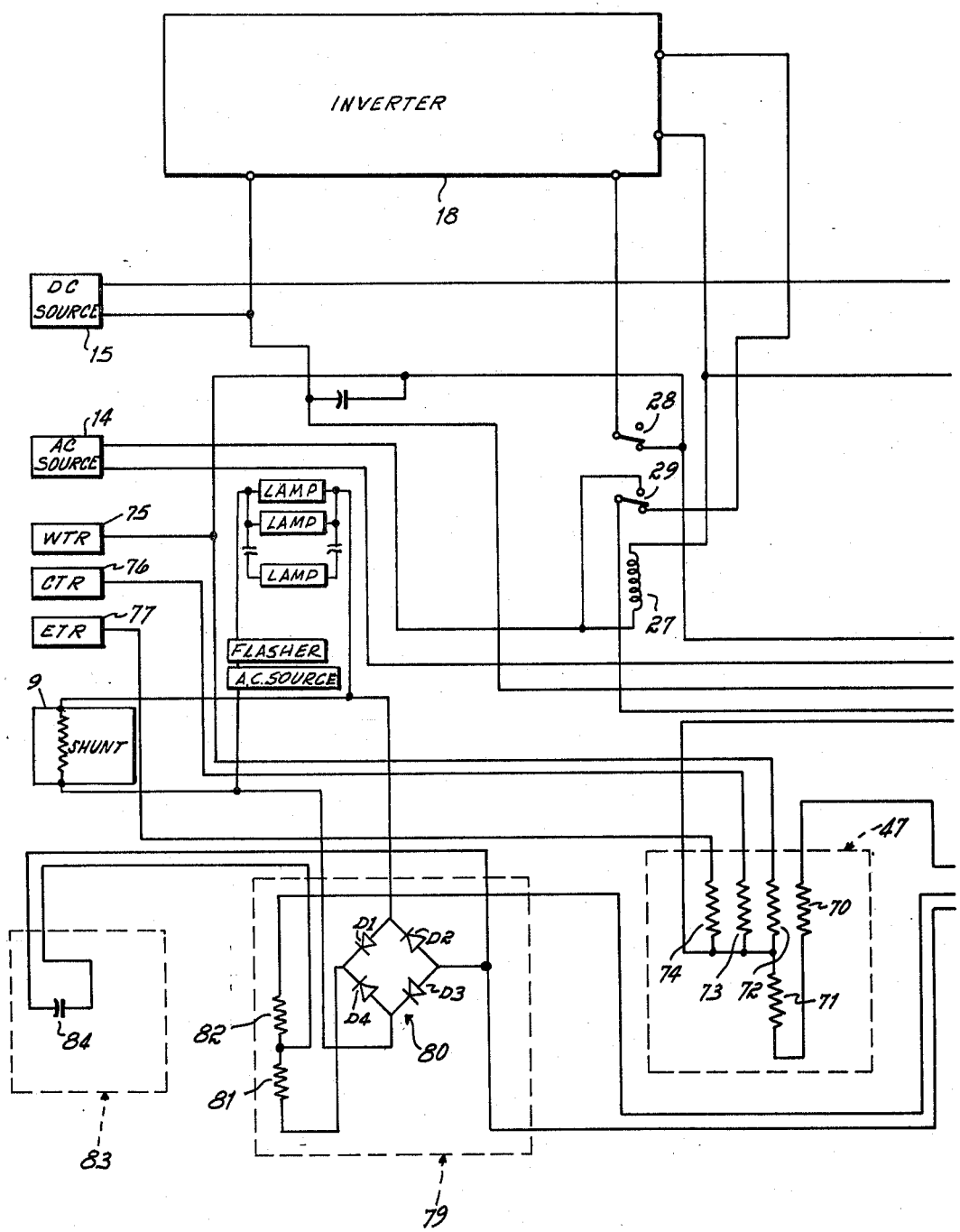

INVENTOR
James D. Snodgrass
BY
Wood, Herron & Evans
ATTORNEYS

United States Patent Office 3,478,202
Patented Nov. 11, 1969

3,478,202
RECORDING SYSTEM
James D. Snodgrass, 739 Agate St.,
San Diego, Calif. 92109
Continuation of application Ser. No. 505,931, Nov. 1, 1965. This application Mar. 18, 1968, Ser. No. 714,110
Int. Cl. B61l 27/00, 25/00, 29/00
U.S. Cl. 246—107      6 Claims

ABSTRACT OF THE DISCLOSURE

A system is disclosed for recording both the operational activity of a multi-signal railway warning device and the presence of trains at a grade crossing. The system includes an intermittently operative chart recorder, a timing signal generator for time-referencing the chart, a plurality of position reference signal generators located at different points along the control track segment for producing a trace on the chart indicative of the position of a train on the control track, and a signal monitor for producing a trace on the chart indicative of the number of lights operative at any given instant.

---

This is a continuation of application Ser. No. 505,931, filed Nov. 1, 1965, and now abandoned.

This invention relates to a railway signal monitoring and recording system for automatically providing a record of the operation of train actuated signalling or warning devices. More particularly, the invention relates to a monitoring and recording system which provides a record from which may be derived train speed and direction over a control track segment, intersecting a road or the like, the points with respect to time and train position during which the signal devices are operative, and the number of signal devices operative during the period the train traverses the control track segment.

Many railroads have found it highly advantageous to provide automatic devices for monitoring and recording the operational activity of highway grade crossing signals.

These devices provide records showing signal activity which are valuable evidence in legal controversies arising out of collisions at grade crossings. Often the determination of whether or not liability attaches to the railway operator hinges on whether or not the railway properly warned the claimant of the approaching train, which in turn hinges on whether or not the grade crossing signal was functioning at the time of the collision. Due to the lack of eyewitnesses, or, if there are eyewitnesses, to their conflicting testimony, the issue of signal performance, and hence liability, frequently cannot be satisfactorily resolved without a lengthy and expensive judical proceeding.

A recording system provides an accurate, reliable, and understandable record of the performance of grade crossing signals which is extremely useful to both the railway operator and the claimant in that it enables them to reconstruct the events leading up to the collision and realistically assess the strength of their respective cases. Many times the railway operator and claimant, when confronted with the facts as presented in the record of signal performance, will come to a satisfactory settlement without resort to the courts, thereby bringing the controversy to a rapid conclusion. The net result, therefore, is that unnecessary expenditures of resources by both the railway operator and claimant, as well as courts, have been avoided merely because of the existence of a record establishing the facts surrounding the collision.

Records of signal activity also provide data respecting train traffic at grade crossings which is useful to both the railway operator and the local highway department. For example, this data enables a railway to check its scheduling and routing, determine the need for railway overpasses and underpasses, etc., and also shows highway traffic engineers the time and extent to which highways are blocked at grade crossings by the passage of trains.

Additionally, an automatic signal recording system is useful in evaluating the performance of the signalling system in enabling the signal department to determine when and where signals are inoperative, permitting prompt remedial action.

Unfortunately, the prior art proposals for signal recording systems have, for a variety of reasons, failed to be totally satisfactory. For example, some of the proposed recording systems in order to provide a record which includes the time of signal activity have necessitated that the time-indexed record medium, whether it is chart paper or magnetic tape, be continuously driven past the recording station on a twenty-four hour per day basis. Inasmuch as the signals themselves are only actuated when the trains are in the vicinity of the grade crossing, which is a mere fraction of the time the record medium is being driven, this practice incurs a great waste of the record medium, in addition to requiring more frequent replenishment of the record medium supply.

Other prior art proposals have sought to overcome this problem but have required the use of expensive and complex timing equipment. For example, one proposed system while advancing the recording medium only when a train is present requires the use of a time and date stamping apparatus. This adds significantly to the cost of the recording equipment and to the problem of maintenance.

Another serious defect of the prior art proposals is their inability to record a partial failure in signal device operation. To understand the nature of this deficiency, it must be appreciated that in many instances the railway grade crossing signal consists of a group of simultaneously flashing lights. It is not unusual for the group to include as many as eight lights. With such a large number of signal devices, it is quite probable that at any one time one or more of the lights may be burned-out or otherwise defective. To date the prior art proposals have failed to provide satisfactory means for recording the activity of each of the signal devices in a group. Thus, the failure of one of eight signal lights is recorded as if a failure of all the lights occurred. This inability to distinguish between a total failure and a partial failure is obviously unsatisfactory. For all practical purposes, in most cases seven lights provide a driver or pedestrian with as much warning of an approaching train as do eight lights. Thus, by being unable to discriminate partial from total failures, a recording system fails one of its primary purposes in providing an accurate picture of signal operation at the time of a collision.

It has therefore been an important object of this invention to provide a railway warning signal recording system which automatically provides a complete and accurate record of warning signal performance including the time of signal operation without resort to expensive and relatively complex time stamping apparatus or wasteful, continuous recording procedures.

It is another object of this invention to provide a railway signal recording system, which provides a record effective to discriminate between conditions of partial and total signal failure.

It is still a further object of this invention to provide a railway recording system which, in addition to economically providing a record of signal performance bearing the time and number of signal devices in operation, also provides a record from which it is possible to derive the train speed and direction as well as the exact location of the train during the period of signal operation.

These and other objectives of the invention are achieved in a preferred embodiment of the invention by providing a recorder which includes a roll of chart paper and a pair of movable styli which function to produce in response to electrical inputs thereto, a pair of visible traces on the chart paper in a manner well known to the art. Also provided is an electrical timing circuit including an R-C network which produces a three second timing signal every thirty minutes. These periodic timing signals are fed to the recorder where they are effective to produce a timing mark on the chart. Each timing mark recorded on the chart represents the lapse of thirty minutes.

An electrical shunt is connected across the entire group of train-actuable warning signals to provide an electrical signal output correlated with the number of signal lights in operation. The shunt output, known as the shunt signal, is fed to the recorder where it is effective to produce a signal performance trace which provides a visual indication of the number of lights in operation during the period when the train is present on a control track segment.

The preferred embodiment also includes a series of train-actuated reference relays spaced at different points along the control track segment. The relays, which are sequentially energized by the train motion, apply signals to a resistive network. The resistive network combines the signals producing a single input to the recorder, known as the train position signal. The magnitude of the train position signal is correlated with the particular ones of the reference relays energized and, thus, when fed to the recorder, produces a visible trace of magnitude of which provides an indication of the position of the train relative to the reference relays.

In operation, the periodic timing signals energize the recorder for three seconds every thirty minutes causing on of the styli to produce a timing mark on the chart. The timing circuitry operates independently of the other portions of the signal recording system and produces a timing mark on the chart whether a train is present on the control track segment or not. Thus, the chart is continuously time calibrated in increments of thirty minutes providing a time base for ascertaining the time of train passage and signal operation.

The operation of the system also involves the production by the recorder of two traces: the train position trace generated in response to the reference signal, and the signal performance trace generated in response to the shunt signal. Specifically, when the train enters and leaves the control track segment, the grade crossing signals are energized and de-energized, respectively, and the chart paper motion initiated and terminated, respectively. During this time the shunt signal is generated and applied to the recorder whereupon one of the two styli produces signal performance trace on the moving chart paper. The amplitude of the signal performance trace reflects the number of signal lights in operation during the train passage over the control track segment. Should none of the lights operate, a zero amplitude trace is produced indicating that, although the train was present, no lights operated. Likewise, if one-half of all the lights operate, a trace having one-half the maximum amplitude will be produced. In addition, should one or more of the lights initiate or terminate operation when the train is at some random position on the control track segment, there will be a discontinuity in the trace a a point corresponding to the track position where the change in number of lights in operation occurred. The size of the amplitude discontinuity reflects the number of lights that are involved in the change.

A further consequence of the train entering and leaving the control track segment is the sequential energization and deenergization, respectively, of the reference relays which, when their signals are combined in the resistive network, produce a uniquely varying train position signal. The train position signal is applied to the recorder where it causes the other of the two styli to generate a train position trace. The magnitude of this trace indicates which of the reference relays are energized and, hence, reflects the position of the train relative to the reference relays.

The train position and signal performance traces, in combination with the timing marks, enable one to derive therefrom much useful information. Specifically, one can derive train speed and direction, time and train position when lights operated, and number of lights operating.

These and other objects of the invention will become more readily aparent from the following detailed description taken in conjunction with the accompanying drawings in which:

FIGURE 1 is a schematic layout of the railway grade crossing showing the physical relationship of signal lights, highway, and control track segment with associated relays.

FIGURE 2 is a portion of the recorder chart showing the train position trace, signal performance trace, and timing mark produced in a typical train passage when all signal lights are operative.

FIGURE 3 is a portion of the recorder chart showing the decreases in amplitude of the signal performance trace which are produced as one or more of the lights become inoperative during train passage.

Figure 4B:
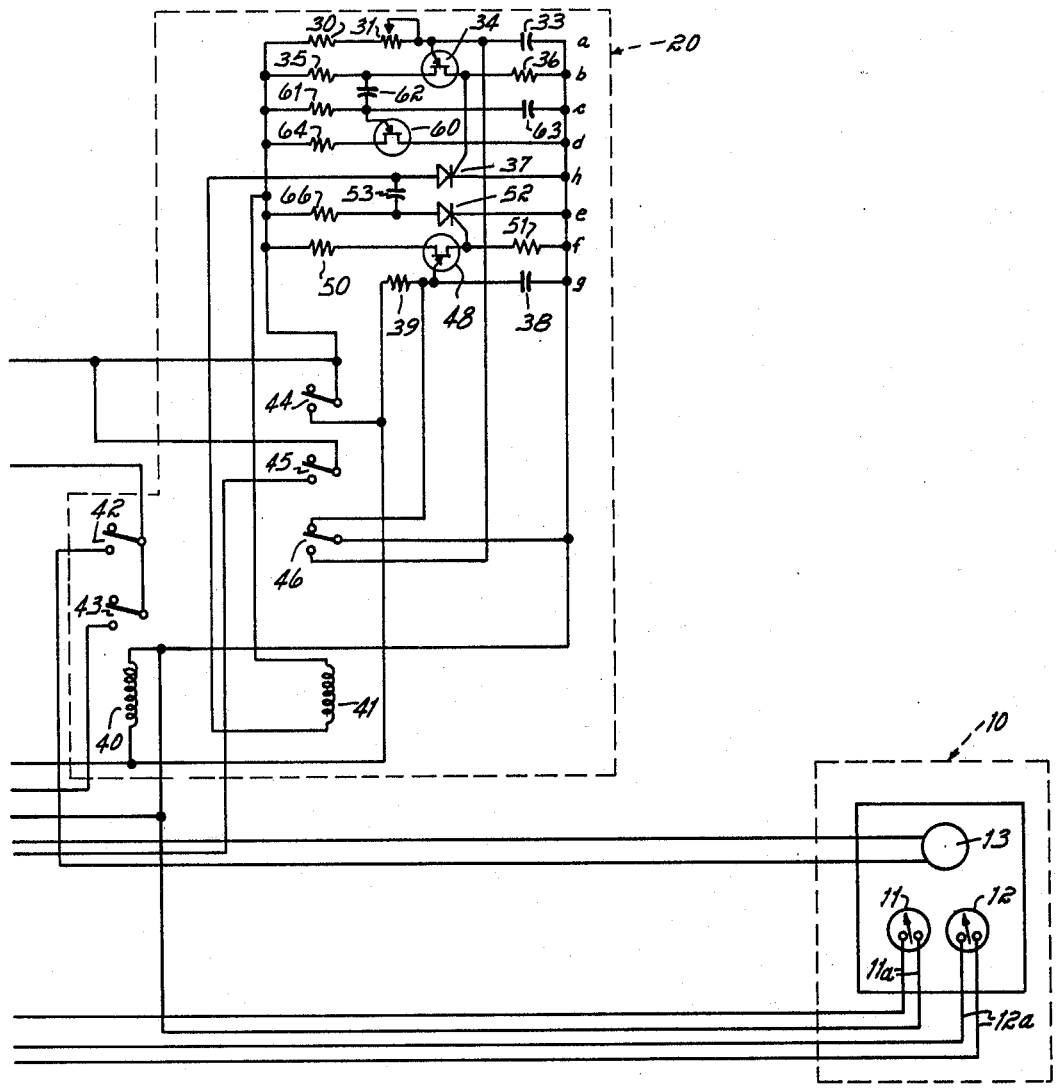

FIGURES 4A and 4B collectively constitute a schematic circuit diagram of the electrical portion of the invention.

The preferred embodiment of the recording system of this invention includes a control track segment 1 having a length of approximately 1540 feet. The control track segment extends from a point A, which is located 1520 feet west of the midpoint C of a highway 3, to a point D, which is located 20 feet east of the highway midpoint C. Included in the control track segment 1 are three separate track sections, each electrically insulated from adjacent sections of track. Specifically, the control track segment 1 includes a western section AB which is 1500 feet long, and a central section BC and an eastern section CD which are each 20 feet long.

Associated with each section of the control track segment 1 is a relay, which is adapted to be energized whenever a train is present on any portion of the track section. Specifically, associated with the western section AB, central section BC, and eastern section CD, are relays WTR, CTR and ETR, respectively. The particular manner in which the energization of each of these relays is controlled by the presence of the train on the respective track sections forms no part of this invention and will not be described in detail. It is sufficient to note in this regard that one suitable manner for energizing the relays is to utilize the train wheels 5, 5 and connecting axle 6 to complete an electrical energization circuit for the various relays when the train is present on the various track sections. The relays, WTR, CTR, and ETR provide control signals to the electrical circuit portion of this invention to effect the generation of the train position trace in a manner to be described later.

Also included in the recording system is a group or cluster of eight signal lights 7 located adjacent the highway 3. These lights 7 are adapted to be energized, i.e., to flash, whenever a train is present on the control track segment 1. While a variety of methods may be utilized to energize the lights 7 in the manner described, one suitable method is to provide each of the relays WTR, CTR, ETR with an additional set of normally open contacts. Each of the additional sets of contacts would be interposed in separate, but parallel circuit paths, connecting a power source and the signal lights 7. Thus, the energization of one or more of the relays WTR, CTR or ETR would complete an energization circuit to the signal lights 7, causing them to flash.

A shunt 9, for example, a resistor, is connected in parallel circuit arrangement with the eight lights 7 to provide a voltage signal the magnitude of which at any instant is correlated with the number of lights 7 that are operative. In practice it has been found that a shunt 9, which produces a 0.8 volt drop when all eight lights are energized, provides a signal of suitable strength. In operation, the shunt 9 produces a 0.7 volt output if 7 lights are operative, a 0.6 volt output if 6 lights are operative, etc. Thus, the shunt 9 produces an output correlated with the number of lights operative at any instant. It is this output which is effective to produce the signal performance trace on the chart paper, in a manner to be described.

The electrical portion of the preferred embodiment, as collectively shown in FIGURES 4A and 4B, basically includes five interrelated sections.

The first section 10 is a recorder. The recorder is a conventional current sensitive recorder probably having a 0–1 ma. capacity. The recorder 10 has two independent channels 11 and 12 each having a stylus. A pair of separate input lines 11A and 12A transmit signals to the respective channels 11 and 12 to produce the record. Specifically, lines 11A transmit timing and reference signals to generate the timing marks and train position trace, respectively, while lines 12A transmit shunt signals to generate the signal performance trace (see FIGURES 2 and 3). A motor 13 also forms part of the recorder section 10. The motor 13, which is energized to drive the chart paper past the styli whenever the train is on the control track segment, is powered by either an A.C. source 14, or a D.C. source 15 in a manner to be described.

The second major section of the electrical circuit is the D.C. to A.C. inverter 18. The function of the inverter 18 is to provide 60 cycle, 120 volt A.C. power to the motor 13 of the recorder 10 from the 10 volt D.C. standby source 15 should the A.C. source 14 fail. The inverter 18, which may be of any of the well known designs, forms no part of the invention and therefore will not be described further.

The third principal section of the electrical circuitry utilized in the preferred embodiment is a timing network 20 which produces a 3 second timing signal every 30 minutes. The timing signal, when fed to the recorder 10, is effective to generate the timing mark (see FIGURES 2 and 3) for time calibration of the chart paper.

As shown in FIGURES 4A and 4B, the timing network 20 includes the following series circuits connected in parallel across the D.C. power source 15 through the relay 40:

(a) resistors 30 and 31 and capacitor 33;
(b) resistors 35 and 36 and uni-junction transistor 34;
(c) resistor 61 and capacitor 63;
(d) resistor 64 and uni-junction transistor 60;
(e) resistor 66 and silicon control rectifier 52;
(f) resistors 50 and 61 and uni-junction transistor 48;
(g) resistor 39 and capacitor 38; and
(h) relay 41 and silicon control rectifier 37.

In addition capacitors 62 and 53 connect, respectively, the serial paths (b) and (c) and serial paths (e) and (h).

Functionally, the timing network 20 includes a 30 minute R-C timer constituted of the serial combination of resistor 30, variable resistor 31 and capacitor 33. This timer can be adjusted by varying the resistance of resistor 31. The 30 minute R-C timer controls the conduction of uni-junction transistor 34. The uni-junction transistor 34 in turn controls the firing of silicon control rectifier 37.

In operation, the capacitor 33 becomes fully charged by the D.C. source 15 after 30 minutes and discharges through the uni-junction transistor 34 which in turn fires the silicon control rectifier 37. The rectifier 37 passes current to the pair of relays 40 and 41 causing them to become energized. Contacts 42 and 43 of relay 40 close connecting the A.C. output of the inverter 18 to the recorded motor 13 initiating chart paper motion. If the A.C. source 14 is operative, a relay 27 is energized closing contacts 28 and transferring contacts 29, which results in changing the source of power for the recorder motor 13 from the inverter 18 to the A.C. source 14.

In addition, relay 41 contacts 44 and 45 close and relay 41 contacts 46 transfer. The closing of contacts 44 applies 10 volts D.C. to what is functionally a 3 second R-C timer network constituted by the resistor 39 and the capacitor 38 initiating the start of a three second timing period. During this three second timing period 10 volts D.C. is applied from the source 15 through contacts 45 to a resistive network 47 where a timing signal is generated, in a manner to be described, which is subsequently fed to the recorder 10 to produce a timing mark. Also during this three second timing period, the capacitor 33 which forms part of the 30 minute timer is fully discharged through transferred contacts 46.

When the capacitor 38 fully charges, which occurs within three seconds of the 30 minute timer capacitor 33 becoming fully charged, the uni-junction transistor 48 is biased into conduction. The uni-junction transistor 48 in turn fires the silicon control rectifier 52. When the rectifier 52 conducts, the capacitor 53 opposes the direction of current flow through the rectifier 37 causing the rectifier 37 to turn-off. The rectifier 52 turns-off when the capacitor 53 has discharged. At this point the contacts 28, 29 of the relay 27, become de-energized, the recorder motor 13 stops, and the 30 minute timer starts another 30 minute timing cycle.

Functionally the uni-junction transistor 60, resistor 61 and capacitors 62 and 63 combine to form a free running oscillator. The purpose of the oscillator is to apply negative pulses to the base of the uni-junction transistor 34, reducing the minimum triggering current required by the transistor 34 and thereby improving the timer accuracy.

The fourth principal section of the electrical circuitry of the preferred embodiment is the resistive network 47. The resistive network 47 includes the serial combination of (a) resistor 70, (b) resistor 71, and (c) the parallel arrangement of resistors 72, 73, and 74. The inputs to the resistive network 47 include the timing signals from the timing network 20 and the signals from the relays WTR, CTR, and ETR. These inputs, which are all 10 volt signals, are applied to the resistive network 47 at different points thereof to produce different amplitude inputs to the recorder 10. Specifically, the WTR relay 75, CTR relay 76, and ETR relay 77, when energized, complete a circuit (not shown) coupling the 10 volt D.C. source 15 to the resistor 72, resistor 73, and resistor 74, respectively. Since the resistors 72, 73 and 74 have different values, the energization of their associated relays 75, 76 and 77 produces different amplitude input signals on lines 11(a) to the recorder 10 thereby producing different amplitude train position traces. Likewise, a 10 volt D.C. timing signal input to the resistor 71 produces a still different amplitude input on lines 11(a) to the recorder 10 producing in turn a correspondingly different amplitude timing mark.

The fifth major section of the electrical circuitry is the signal performance unit 79. This unit has as its input the shunt signals from the shunt 9. These signals have an amplitude, as previously noted, which is correlated with the number of signal lights 7 operative. In addition, the shunt signal is an intermittent signal inasmuch as the signal lights are flashing when operative. Furthermore, each intermittent shunt signal is a 60 cycle A.C. signal because the signal lights 7 are powered by the A.C. power source 14. The light flashing frequency, of course, is of the order of a few cycles per second in contrast to the relatively higher frequency of the A.C. source 14 powering the lights.

To rectify the A.C. shunt signals a diode rectifier 80 constituted of diodes D1, D2, D3 and D4 is included in the signal performance unit 79. The A.C. shunt signals are applied to the rectifier 80 across the two points defined by the junctions of diodes D1 and D2 and diodes D3 and D4. The rectifier output, which is taken at the junction of diodes D1 and D4, is fed to the recorder 10 on lines 12a through a pair of serially connected current limiting resistors 81 and 82. The resistors 81 and 82 limit the current fed to the recorder 10 to 1 ma., thereby avoiding recorder damage.

A bank of capacitors 83 are connected in parallel with the diode rectifier 80 and resistor 81. The number and capacitance of the capacitors 84 depend on the number of flashing lights 7 to be monitored. The capacitors 84 charge when current is flowing through the shunt 9, and discharge through the recorder 10 when current is not flowing in the shunt which occurs when the flashing lights are momentarily off. Capacitors 84 function therefore, to average the level of the shunt signal as seen by the recorder 10 over the on and off period as the lights 7 flash. This bank of capacitors 83, by this averaging function, produces a signal performance trace which has a fairly sharp and narrow bandwidth.

Operation

In the following description, for the purposes of illustration, it will be assumed that a train is approaching the grade crossing from the west, i.e., moving eastwardly. As shown in FIGURE 1, when the train reaches point A, which is approximately 1520 feet from the midpoint C of the highway 3, the train wheels 5 will pass onto the leftmost end of the control track segment 1. More specifically, the train wheels 5 will pass onto the leftmost end of the western section of the control track segment 1. When this occurs, the wheels 5 and axle 6 complete a circuit to WTR relay 75, energizing the relay. The energization of the WTR relay produces a number of different results. First, it causes 10 volts D.C. to be applied to the inverter 18, which in turn causes 120 volts A.C. to be applied through the normally closed contacts 29 of relay 27 and contacts 42 and 43 of relay 40, to the recorder motor 13, initiating chart paper motion past the pair of styli of channels 11 and 12 in the direction indicated in FIGURE 2. The normally open contacts 42 and 43 of the relay 40 close when the relay 40 becomes energized by the application to the relay of the same 10 volt D.C. signal as is applied to the inverter 18. If, however, A.C. power is being supplied by the A.C. source 14, the relay 27 becomes energized opening contacts 28 and transferring contacts 29, thereby removing the inverted D.C. power from the recorder motor 13 and substituting therefor A.C. power from the source 14. Thus, the recorder motor is powered by the A.C. source 14 if A.C. power is available; otherwise, by the inverted D.C. source 15.

The energization of the WTR relay 75, in addition to providing power to the recorder 10, also actuates suitable circuitry (not shown) for initiating the flashing of the lights 7. When this occurs, the shunt 9 produces a shunt signal whose magnitude is proportional to the number of lights flashing. This intermittent A.C. shunt signal is fed to the signal performance unit 79 where it is rectified by the diode rectifier 80 and its current limited by the current limiting resistors 81 and 82. The rectified and current-limited shunt signal is then fed to one of the channels 12 of the recorder 10 where it produces the signal performance trace (see FIGURE 2). Assuming all eight of the lights 7 are flashing, the signal performance trace will register a maximum amplitude to reflect this operational condition of the lights. Suitable calibration 90 of the lower one-half of the chart paper can be used to correlate the amplitude of the signal performance trace with the number of lights which are operative.

The energization of the WTR relay 75 has a further consequence, namely, it results in the connection of the 10 volt D.C. source 15 to the resistor 72 of the resistive network 47. This causes a current to flow through serially connected resistors 72, 71 and 70 to other channel 11 of the recorder 10 via lines 11(a). This current produces the WTR portion of the train position trace on the upper one-half of the record sheet (see FIGURE 2). The amplitude of the train position trace is determined by the combined resistance of resistors 70, 71 and 72.

In practice, to aid in distinguishing the different portions of the train position trace, the resistance values of the resistive network 47 are chosen so that no two portions of the trace have the same amplitude. Stated differently, the resistance values are chosen so that as the train moves from one section of the control track segment to another, energizing different combinations of the relays 75, 76, 77 and applying different combinations of signals to the resistive network 47, the amplitude of the signals input to channel 11 of the recorder for each combination of relays energized will be different. Thus, by looking at the amplitude of the train position trace, it is possible to determine at any instant which of the relays 75, 76, 77 are energized and, with this information, to determine the position of the train at that instant.

The recorder 10 continues to produce the signal performance trace and the WTR portion of the train position trace as the train moves along the western section of the control track segment from point A to point B. When the first car of the train arrives at point B, the CTR relay 76 becomes energized, resulting in the application of a 10 volt D.C. signal to the resistor 73 of the resistive network 47. Since portions of the train are still on the western track section, the WTR relay 75 remains energized. Thus, two signals are input to the resistive network 47—one to resistor 72 produced by the WTR relay 75 and one to resistor 73 produced by the CTR relay 76. With two signals present, the input to the recorder on lines 11(a) is increased and the amplitude of the train position trace is increased. Thus, the entering of the train upon the central section of the control track segment at point B increases the signal to channel 11 of the recorder producing a discontinuity in the train position trace. The discontinuity, which appears between the WTR and the WTR–CTR portions of the signal position trace, reflects the arrival of the first car of the train at point B.

In like manner, when the first car of the train arrives at point C, the ETR relay is energized, applying a third 10 volt D.C. input to the resistive network 47 at resistor 74. The three inputs from the relays 75, 76 and 77 produce a still larger input to channel 11 of the recorder 10. This increased input to the recorder produces a discontinuity in the train position trace, which appears between the WTR–CTR and WTR–CTR–ETR portions of the trace, and reflects the arrival of the first car of the train at point C. The WTR–CTR–ETR section of the train position trace will continue to be generated for as long as the train is simultaneously on the western, central, and eastern sections of the control track segment 1.

Should a timing signal be generated by the timing network 20 in the manner previously described, indicating that 30 minutes has elapsed, an increase in the input to the recorder channel 11 will result. The increase is produced as a result of a 10 volt D.C. signal being input to resistor 71 causing a greater current flow to the recorder on lines 11(a) than is possible with any other resistive network input or combination of inputs. The increased current flow of the recorder 10 produced as a result of a timing signal input to resistor 71 produces a 3 second duration timing mark (see FIGURE 2). The timing mark, in this example, constitutes a discontinuity in the WTR–CTR–ETR portion of the train position trace. It is noted that no current can flow in the resistors 72, 73 or 74 to the recorder when a timing signal is input to the resistor 71 since no voltage drop can appear across the resistors 72, 73 or 74 of a polarity to cause such flow. The 10 volt D.C. signal from the timing network cancels any voltage drop across the resistors 72, 73 or 74 that might be present due to signals from the relays 75, 76 or 77.

Of course, if the timing signal occurs when no train is present on the control track segment 1, the recorder motor 13 is energized by the timing network 20 in a manner previously described, and a three second timing mark is produced on the chart which does not constitute an interruption or discontinuity of the train position trace.

The amplitude of the timing mark is the same regardless of the presence or absence of a train on the control track segment.

As the train continues moving eastwardly, the last car of the train eventually leaves the western section of the control track segment, de-energizing the WTR relay 75, moving the input to resistor 72, decreasing the input to channel 11 and producing a discontinuity in the train position trace. The discontinuity, which appears between the WTR–CTR–ETR and CTR–ETR sections of the trace reflects the fact that the last car of the train has passed point B. Likewise as the train continues moving eastwardly, the last car of the train eventually leaves the central section of the control track segment. When this occurs, CTR relay 76 is de-energized, the input to resistor 73 is removed, and the signal to the recorder channel 11 is decreased producing a discontinuity in the train position trace. The discontinuity appears between the CTR–ETR and ETR portions of the train position trace and reflects the fact that the last car of the train has passed over the central section of the control track segment 1.

When the train has completely left the control track segment 1, i.e., the last car of the train has left the eastern section, the ETR relay 77 is de-energized. At this point none of the relays are energized, therefore no inputs to the resistive network 47 and the recorder channel 11 are present. Under these conditions, the amplitude of the train position trace drops to zero. Additionally, since none of the relays 75, 76 or 77 are energized, the power to the flashing lights 7 is removed and they cease to operate; and the power to the recorder motor 13 is removed and the chart paper ceases to be driven, terminating both the train position and signal performance traces.

Referring to FIGURE 2, it is observed that the record provides the following information: the speed and direction of the train motion; the time when the train passes over the control track segment, and the period during which the lights are operative; and the number of lights operative. For example, knowing the speed of the chart paper, it is possible to derive the length of time the train was in a particular section of the control track segment. With this information the speed can be computed knowing the length of the particular section of control track segment in question.

As for determining the train direction, it is simply a matter of determining, from the amplitude of the initial portion of the train position trace, whether the WTR relay 75 or the ETR relay 77 was energized first. In the preceding illustration, the WTR relay 75 was first to be energized. Hence, the train was approaching from the west. If the train approaches from the east, the ETR relay 77 is energized first, a condition which is determinable by inspecting the amplitude of initial portion of the train position trace.

To determine the time of train passage, it is only necessary to know the time the roll of chart paper was started and the number of timing marks that have been produced between that time and the time of the trace in question. The product of (a) the number of timing marks and (b) the time between marks which in this example is 30 minutes, provides the time of train passage.

As for the number of lights operative during a train passage, it is only necessary to inspect the signal performance trace and determine its amplitude at the time or place in question. The amplitude, as previously noted, is correlated with the number of lights operative. For example, in the illustrative example, it is clear that all 8 lights were operative during the entire train passage. Referring to FIGURE 3, it is seen how the amplitude of the signal performance trace decreases from maximum amplitude to zero amplitude as the number of lights operative decreases, one by one, from eight to zero.

While the invention has been described with respect to one preferred embodiment thereof, those skilled in the art will appreciate that numerous modifications may be made without departing from the scope of this invention. For example, the invention was described using a paper chart recording medium. However, other recording mediums are possible as, for example, magnetic tape. Also, the invention is not intended to be limited to recording the operational activity of signal lights only. For example, it is contemplated that a shunt could be placed across the motor that operates a set of railway crossing gates or a set of track switches to monitor and record their activity.

Having described my invention, I claim:

1. In a railway system which includes a control track segment and a plurality of electrically operated signal lights actuable in response to the presence of a train on said control track segment, a signal monitor comprising:
  means electrically connected to said plurality of lights for producing an electrical output signal correlated with the number of said plurality of lights in operation;
  timing means for producing timing signals of short duration at predetermined time intervals; and
  chart recording means rendered operative in response to the presence of said train on said control track segment for recording said timing and output signals, said timing means being effective to operate said chart recording means to advance said chart and cause a timing mark to be imprinted thereon at said predetermined time intervals whereby a record is obtained with reference to time of the proportion of said plurality of signal lights rendered operative in response to the presence of said train on said control track segment.

2. In a railway system of claim 1 in which said timing means includes an R–C electrical circuit.

3. In a railway system which includes a control track segment including a plurality of track sections and a plurality of electrically operated signal lights actuable in response to the presence of a train on said control track segment, a signal monitor comprising:
  means electrically connected to said plurality of lights for producing an electrical output signal correlated with the number of said plurality of lights in operation;
  timing means for producing timing signals of short duration at predetermined time intervals;
  a signal circuit actuable by the traversal of said train over said control track segment for producing a train position signal having an amplitude correlated with the instantaneous position of said train on one of said control track sections, said signal circuit comprising a resistive network and a plurality of relays, different ones of said relays being energized when said train traverses each of said track sections; and
  chart recording means rendered operative in response to the presence of said train on said control track segment for recording the output signal correlated with the number of lights in operation and train position signals, said chart recording means being further operative to record said timing signals, whereby a record is obtained of the time and operational activity of said devices with reference to the location of said train on one of said control track sections.

4. In a railway system which includes a control track segment having multiple sections and a plurality of electrically operated signal devices actuable in response to the presence of a train on said control track segment, the signal recording system comprising:
  means for producing a first electrical control signal the magnitude of which is correlated with the operation of said signal devices and effective to continuously indicate the number of said devices which are operative;
  means for producing a second electrical signal the magnitude of which is capable of residing at multiple values each correlated with the position of a train relative to a difference one of said sections of said control track segment;

chart recording means responsive to said first and second electrical signals;

means for advancing said chart in response to the presence of a train on said control track segment; and said chart recording means forming first and second continuous traces in response to said first and second electrical signals, respectively, showing the number of signal devices operative corresponding to the train position relative to said sections of said control track segment.

5. In a railway system which includes a control track segment and a plurality of electrically operated signal devices actuable in response to the presence of a train on said control track segment, the signal recording system comprising:

means for producing a first electrical control signal the voltage of which is correlated with the operation of said signal devices and effective to continuously indicate the number of said devices which are operative;

means for producing electrical signals the voltage of which is correlated with the position of a train relative to said control track segment;

chart recording means responsive to said first and second signal means;

means for advancing said chart in response to the presence of a train on said control track segment;

said chart recording means forming two continuous traces showing the number of signal lamps operative corresponding to the train position relative to said control track segment;

timing means for producing timing signals of short duration at predetermined time intervals, and said timing means being effective to operate said chart recording means to advance said chart and cause a timing mark to be imprinted thereon at said predetermined time intervals.

6. The signal recording system of claim 5 in which said timing means includes an R-C electrical circuit.

References Cited

UNITED STATES PATENTS

| | | |
|---|---|---|
| 1,208,512 | 12/1916 | Dempster. |
| 1,256,723 | 2/1918 | Nicholson. |
| 1,350,355 | 8/1920 | Brach. |
| 2,066,309 | 1/1937 | Allen. |
| 2,133,640 | 10/1938 | Thompson. |
| 2,153,675 | 4/1939 | Pflasterer. |
| 2,941,186 | 6/1960 | Gelli. |
| 3,109,616 | 11/1963 | Hailes. |
| 3,123,802 | 3/1964 | Priesemuth. |
| 3,143,729 | 8/1964 | Power. |
| 3,252,137 | 5/1966 | Montgomery. |

FOREIGN PATENTS 812,609    4/1959    Great Britain.

ARTHUR L. LA POINT, Primary Examiner

G. H. LIBMAN, Assistant Examiner

U.S. Cl. X.R.

246—123; 346—33